United States Patent
Sugimoto et al.

[11] Patent Number: 5,257,816
[45] Date of Patent: Nov. 2, 1993

[54] AIR BAG APPARATUS FOR VEHICLE

[75] Inventors: Tomiji Sugimoto; Tsutomu Fukui; Atushi Makino; Nozomu Shoji, all of Utsunomiya, Japan

[73] Assignee: Honda Giken Kogyo Kabushiki Kaisha, Tokyo, Japan

[21] Appl. No.: 796,182

[22] Filed: Nov. 22, 1991

[30] Foreign Application Priority Data

Dec. 7, 1990 [JP] Japan ................................. 2-400891
May 14, 1991 [JP] Japan ................................. 3-137016

[51] Int. Cl.⁵ ............................................... B60R 21/32
[52] U.S. Cl. ..................................... 280/735; 280/731
[58] Field of Search ............................ 280/735, 731

[56] References Cited

U.S. PATENT DOCUMENTS

| | | | |
|---|---|---|---|
| 3,871,472 | 3/1975 | Hosaka et al. | 280/735 |
| 4,700,973 | 10/1987 | Gademann et al. | 280/735 |
| 5,011,181 | 4/1991 | Laucht et al. | 280/735 |
| 5,037,129 | 8/1991 | Fritz et al. | 280/734 |
| 5,046,149 | 9/1991 | Nunan | 280/735 |
| 5,080,394 | 1/1992 | Mori et al. | 280/731 |

FOREIGN PATENT DOCUMENTS

| | | | |
|---|---|---|---|
| 2522302 | 9/1983 | France . | |
| 0042736 | 4/1979 | Japan | 280/735 |
| 0212148 | 9/1988 | Japan | 280/735 |
| 0212149 | 9/1988 | Japan | 280/735 |

Primary Examiner—Eric D. Culbreth
Attorney, Agent, or Firm—Armstrong, Westerman, Hattori, McLeland & Naughton

[57] ABSTRACT

An air bag apparatus for a vehicle is characterized in that an air bag, an inflator and acceleration sensors for controlling the inflator are closely disposed in a single place to constitute an air bag unit. The acceleration sensors in the air bag unit are made up of a plurality of acceleration sensors of different kinds. The air bag unit is disposed on a steering wheel and each of the acceleration sensors is disposed such that the direction of movement of a movable element to be provided in each of the acceleration sensors is parallel to an axis of rotation of the steering wheel. The inflator is electrically ignited and each of the acceleration sensors controls the electric current supply to the inflator.

2 Claims, 5 Drawing Sheets ent of this invention;
AIR BAG APPARATUS FOR VEHICLE

BACKGROUND OF THE INVENTION

This invention relates to an air bag apparatus to be mounted on a vehicle such as an automobile for the protection of a passenger thereof.

The air bag apparatus comprises an air bag, an inflating means and an acceleration sensor for controlling the inflating means. At the time of crushing of the vehicle, the inflating means is applied with electric current by the acceleration sensor to generate a gas, thereby inflating the air bag. As the air bag apparatus for the driver's seat, there is conventionally known one in which the air bag and the inflating means are disposed on a steering wheel. In such an arrangement, it is normal practice to dispose the acceleration sensor in a front portion of the vehicle and to electrically connect it to the inflating means by means of a harness.

There is also known one in which the inflating means is mechanically ignited through the acceleration sensor (see Japanese Published unexamined patent application No. 248454/1985). In this case, the air bag, the inflating means and the acceleration sensor are naturally disposed closely to each other in one place.

In case of the one in which the inflating means is electrically ignited, it is preferable to construct the air bag unit by closely disposing the air bag, the inflating means and the acceleration sensor in one place when the simplicity of the electric wiring and the ease of mounting on the vehicle body are considered. In either type of electrical and mechanical ignition of the inflating means, it is preferable to provide a plurality of acceleration sensors in order to increase the reliability. However, if the plurality of acceleration sensors are closely disposed in a single place, they are placed in one and the same environmental conditions, thereby giving rise to a possibility of their going out of order all at the same time.

OBJECT AND SUMMARY OF THE INVENTION

In view of the above disadvantages, this invention has an object of providing an air bag apparatus which has disposed therein an air bag, an inflating means and acceleration sensors as a unit in a single place and is easy in mounting on the vehicle body and is highly reliable.

In order to attain the above-described object, according to this invention, an air bag apparatus for a vehicle is characterized in that an air bag, an inflating means and acceleration sensors for controlling the inflating means are closely disposed in a single place to constitute an air bag unit and that the acceleration sensors in the air bag unit are made up of a plurality of acceleration sensors of different kinds.

Because the plurality of acceleration sensors to be provided in the air bag unit are different in kind, there is little or no possibility of their going out of order all at the same time even if they are placed in the same environmental conditions. As a result, the reliability of the air bag apparatus is improved. In case where the inflating means is electrically ignited and each of the acceleration sensors controls the electric charging to the inflating means, it is possible, by constituting them into an air bag unit, to mount it on the vehicle body unit by unit, unlike the one in which each of the acceleration sensors is separately mounted on different parts of the vehicle body. This brings about advantages in that mounting the unit on the vehicle body is facilitated and that the harnesses for wiring each of the acceleration sensors and the inflating means are not required any more. In this type of electrically igniting the inflating means, there are advantages in that different kinds of acceleration sensors are easily obtainable and that the failure in the sensors can be easily detected. The acceleration sensor is provided therein with a movable element which moves at the time of crushing of the vehicle. In case the air bag unit is mounted on the steering wheel, it is advantageous to mount each of the acceleration sensors such that the direction of movement of the movable element becomes parallel to the axis of rotation of the steering wheel because, even though the position of each sensor varies in accordance with steering operation, the direction of movement of the movable element can be maintained constant. It follows that the capacity or characteristics of crushing detection do not vary with the steering operation.

BRIEF DESCRIPTION OF THE DRAWINGS

The above and other objects and the attendant advantages of this invention will become readily apparent by reference to the following detailed description when considered in conjunction with the accompanying drawings wherein.

DETAILED DESCRIPTION OF A PREFERRED EMBODIMENT

Figure 1:
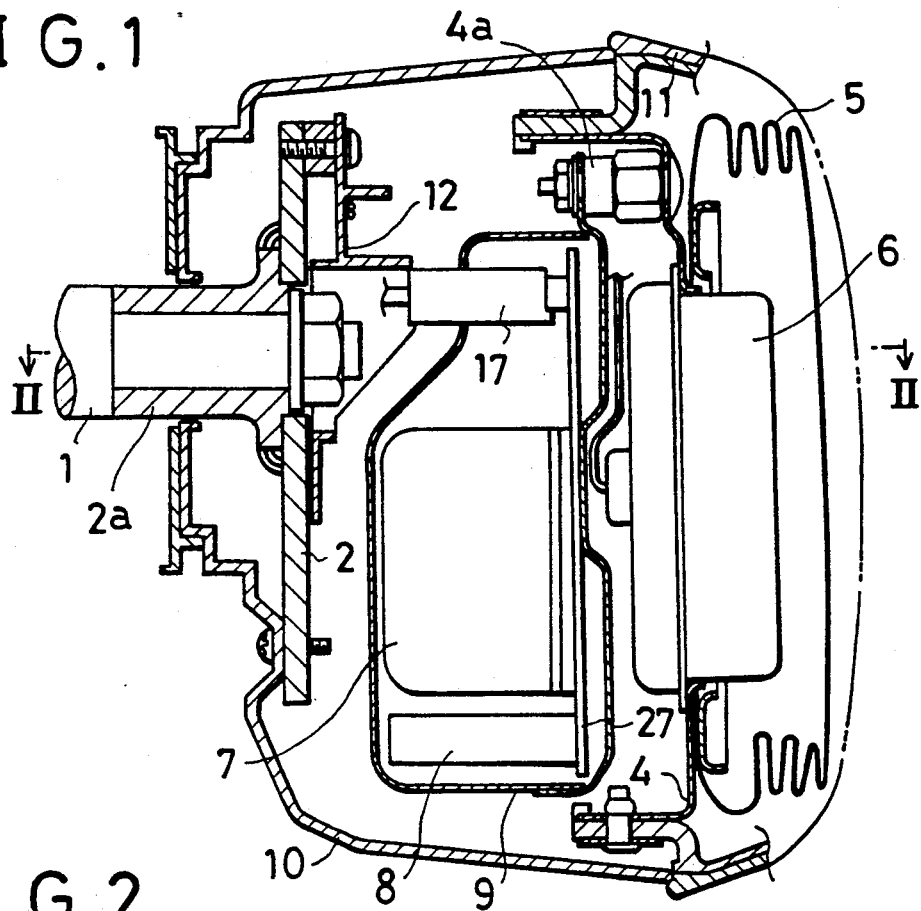
FIG. 1 is a sectional side view showing an embodiment of this invention.
Figure 2:
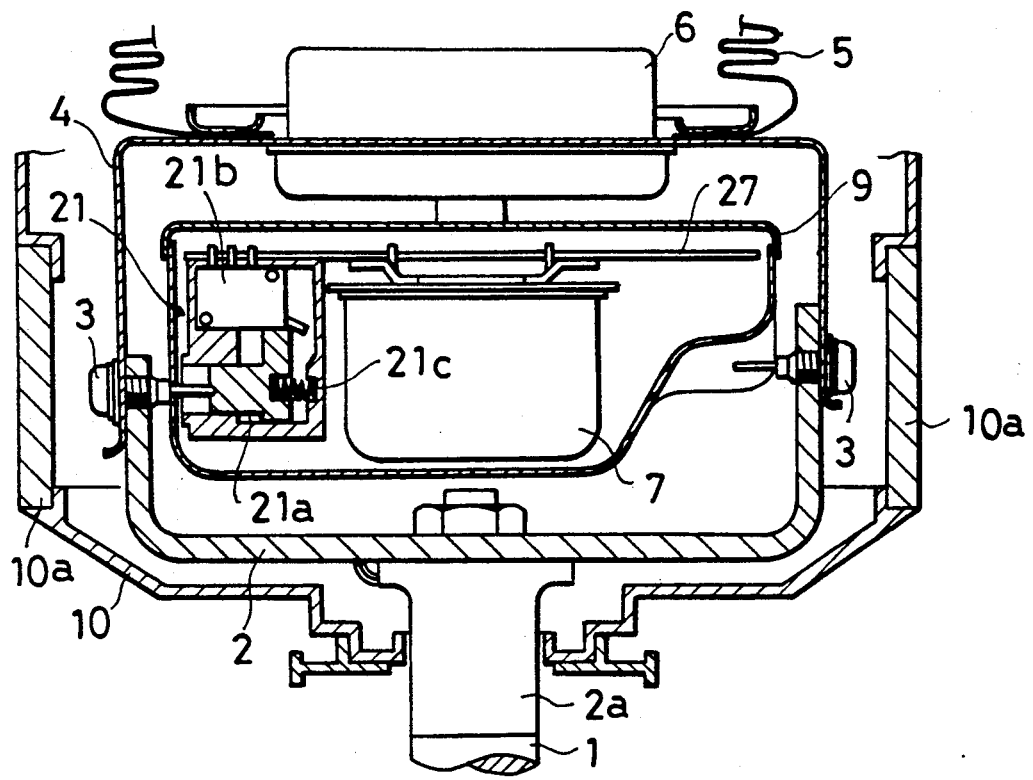
FIG. 2 is a sectional view taken along the line II—II in FIG. 1.

Referring to FIGS. 1 and 2, numeral 1 denotes a steering shaft, numeral 2 denotes a base plate of a steering wheel which is provided with a boss portion 2a to be fitted into the steering shaft 1. An air bag 5 and an inflating means 6 are mounted on a retainer 4 which is fastened by bolts 3 to the base plate 2. A control box 9 which contains therein two pieces of a first and a second acceleration sensors 7, 8 is bolted to boss portions 4a which are fixed to the retainer 4. In this manner, there is constituted an air bag unit which is made up by closely disposing on the retainer 4 the air bag 5, the inflating means 6 and the first and the second acceleration sensors 7, 8. This air bag unit is mounted on the steering wheel at the retainer 4. The location of mounting the air bag unit is covered by a lower cover 10 which is fixed to the base plate 2 and an upper cover 11 which is fixed to the retainer 4. It is so arranged that, when a gas is generated through the ignition of the inflating means 6, the air bag 5 is inflated by breaking through the upper cover 11. In the figures, numeral 10a denotes those caps on the lower cover 10 which are provided over operating holes for the above-described bolts 3, and numeral 12 denotes a resin plate for supporting a harness provided on the base plate 2.

Figure 3:
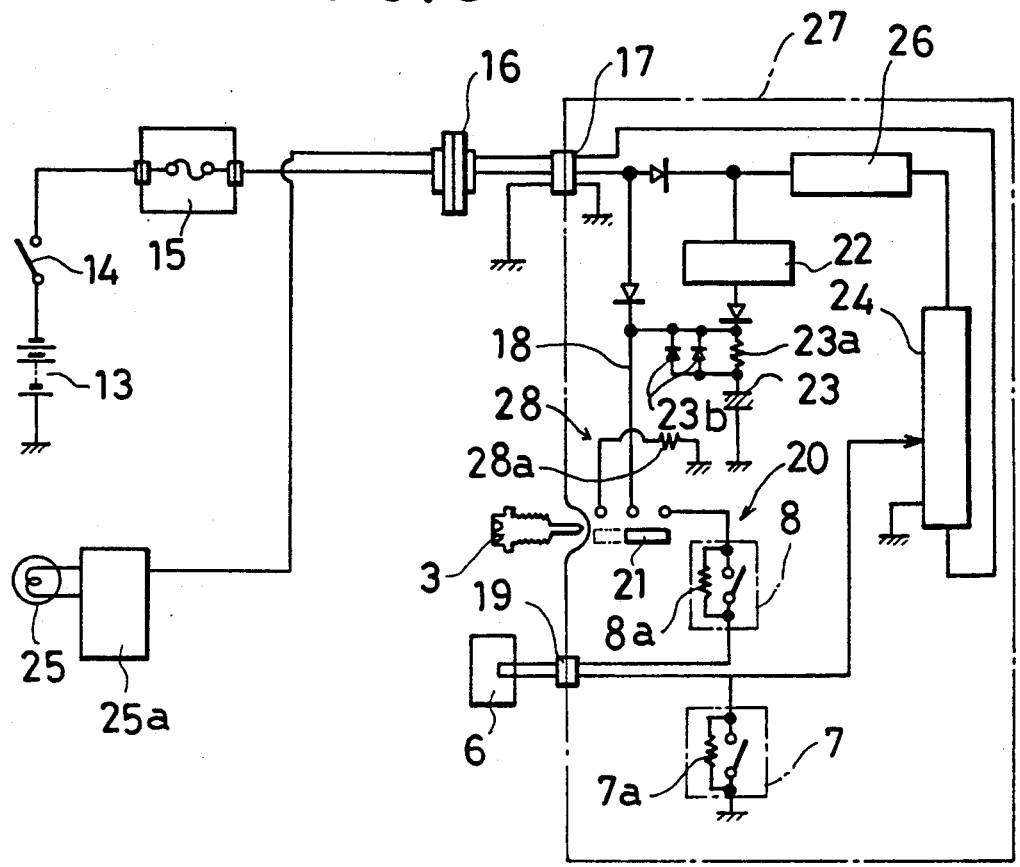
FIG. 3 is a circuit diagram of a control circuit for an inflating means which is incorporated into the above-described embodiment.

The above-described inflating means 6 is of the type to be electrically ignited. Its control circuit is as shown in FIG. 3. The control circuit comprises: an electric power supply line 18 which is connected to a battery 13 via an ignition switch 14, a fuse box 15, a slip ring 16 and a coupler 17; an ignition circuit 20 which is connected to the electric power supply line 18 via a wrong operation preventing switch 21 to be described later and is made up by connecting to the inflating means 6, the first acceleration sensor 7 and the second acceleration sensor 8 in series via a coupler 19; and a backup capacitor 23 which is charged by a booster circuit 22 via a resistor 23a and is connected to the electric power supply line 18 via diodes 23b. Each of the acceleration sensors 7, 8 has connected in parallel thereto a bypass resistor 7a, 8a, respectively. The ignition circuit 20 is constantly charged with a weak electric current via these bypass resistors 7a, 8a. A monitor circuit 24 is provided for monitoring the electric potential between the inflating means 6 and the first acceleration sensor 7 which is connected to the side of grounding. From the changes in the electric potential, the failures such as the breaking of wire or short-circuit of the inflating means 6 or the acceleration sensors 7, 8 are detected. A signal from the monitor circuit 24 is input to a lamp circuit 25a of an alarm lamp 25 which is provided on an instrument panel to switch on the lamp 25 at the time of the failures. Numeral 26 denotes a monitoring electric power source.

Figure 5:
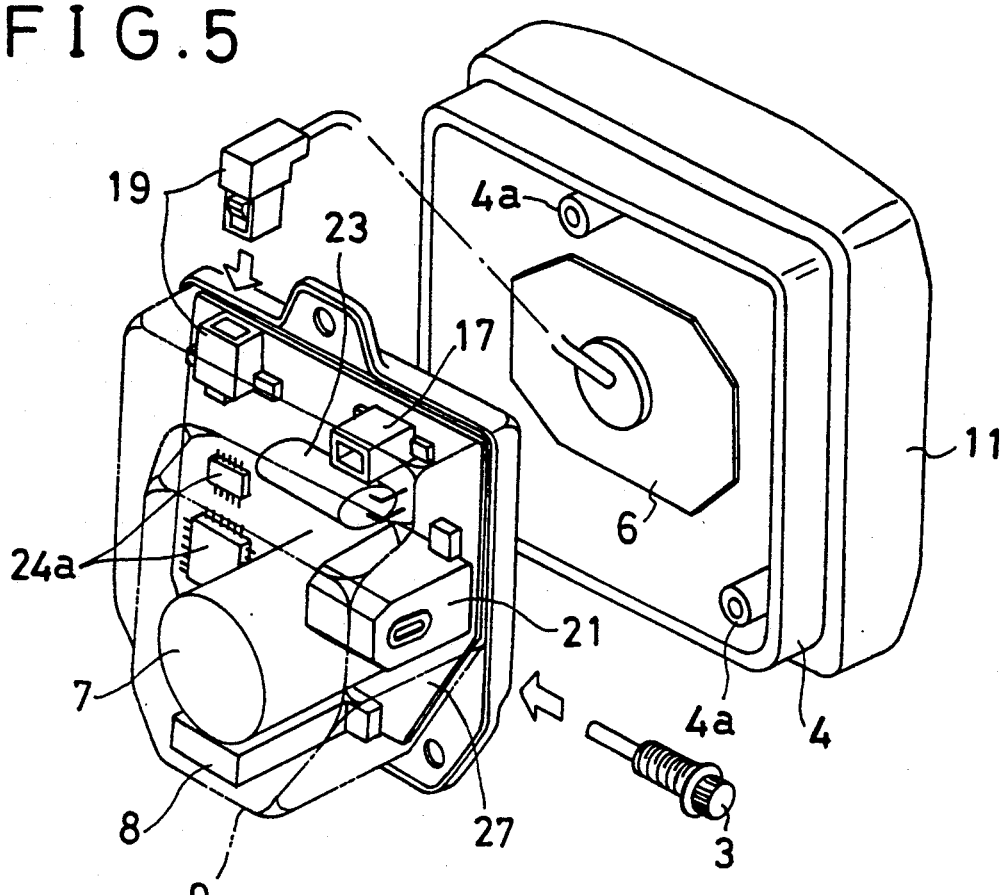
FIG. 5 is a perspective view of a control box in the above-described embodiment.

In the above-described control box 9 there is contained an electric wiring circuit board 27. As shown in FIG. 5, there are provided on the circuit board 27 the above-described couplers 17, 19, the first and the second acceleration sensors 7, 8, the wrong operation preventing switch 21, the backup capacitor 23 and chips 24a for the monitor circuit 24. The control circuit for the inflating means 6 is thus arranged on the circuit board 27 as a unit.

The wrong operation preventing switch 21 comprises, as shown in FIG. 2, a sliding member 21a which moves in interlocking with the mounting bolt 3 for the retainer 4 and a limit switch 21b which is operated in cooperation with the sliding member 21a. When the bolt 3 is loosened for removing the air bag unit by separating the retainer 4 from the base plate 2, the sliding member 21a is moved outwards by a spring 21c as a result of its being released from the urging force of the bolt 3. The limit switch 21b is thereby changed over from the ON condition in which the electric power supply line 18 is connected to the ignition circuit 20 as shown by solid lines in FIG. 3, to the OFF condition in which the above-described electrical connection is cut off. According to this arrangement, when the air bag unit is removed, the electrical connection between the battery 13 as the main electric power supply as well as the capacitor 23 as the backup electric power supply and the inflating means 6 is cut off. Therefore, even if the acceleration sensors 7, 8 are switched on by a shock given to the air bag unit, the inflating means 6 does not operate.

In the Japanese Published unexamined patent application No. 222954/1988 there is proposed an apparatus for preventing the wrong operation of the air bag unit. The apparatus comprises a short-circuiting circuit which detours an ignition circuit, and a switch which is interposed in the short-circuiting circuit and is switched on by the removal of the air bag unit. If this apparatus is supposed to be applied to the above-described air bag unit of this invention, the capacitor 23 is discharged through the short-circuiting circuit when the air bag unit is removed and, once the coupler 17 is detached, the inflating means 6 will never be operated thereafter even if the air bag unit were subjected to shocks. The coupler 17 is normally provided on the rear side of the air bag unit. Therefore, the coupler 17 can be detached only after the air bag unit has been removed. It follows that if one fails to switch off the ignition switch 14, the electric current from the battery 13 flows through the short-circuiting circuit when the circuit is closed at the time of removing the air bag unit. Therefore, in order to prevent the overdischarging of the battery 13, the resistance of the short-circuiting circuit must be set to a relatively large value. As a result, even if the short-circuiting circuit is closed, there will remain a condition in which the ignition circuit 20 could be supplied with a relatively large amount of electric current. Therefore, there is a possibility that the inflating means 6 is operated when the air bag unit is subjected to shocks at the time of removing it. To prevent this inadvertent operation of the air bag unit, it becomes necessary to carry out the operation of removing the air bag unit carefully so as not to subject it to shocks, thus resulting in a long time required for the operation.

On the contrary, if the above-described wrong operation preventing switch 21 of this invention is provided, the switch 21 is switched off at the time of removing the air bag unit, and the electrical connection between the battery 13 as well as the capacitor 23 and the ignition circuit 20 is cut off. Therefore, there is no possibility at all of the electric current's flowing through the ignition circuit 20. It follows that there is no need of paying extra attention at the time of removing the air bag unit, resulting in an easy removal work.

Figure 4:
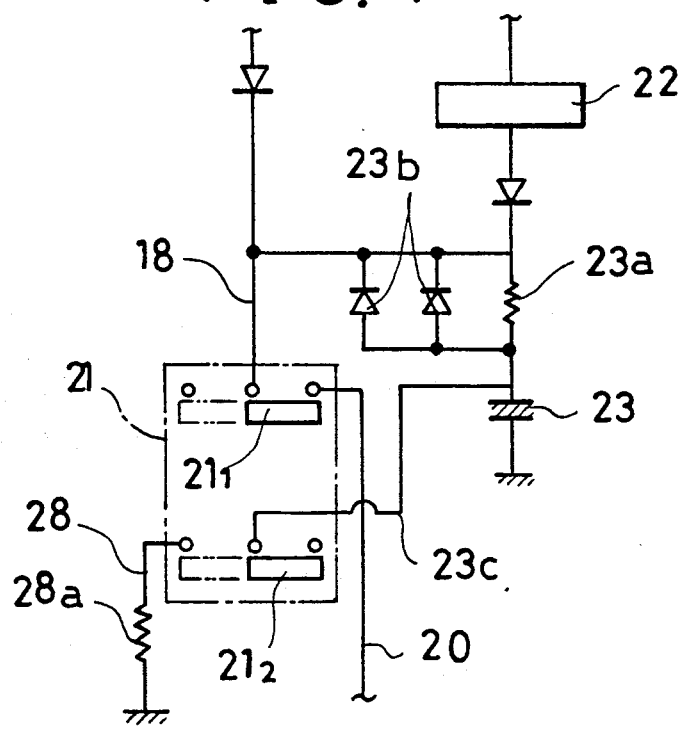
FIG. 4 is a circuit diagram of an important portion of another embodiment of the control circuit.

Further, in this embodiment, it is so arranged that, when the wrong operation preventing switch 21 is switched off, the electric power supply line 18 is grounded as shown by imaginary lines in FIG. 3 via a discharging circuit 28 having interposed therein a resistor 28a so that the capacitor 23 is discharged through the discharging circuit 28. According to this arrangement, even if the wrong operation preventing switch 21 were to be mischievously or otherwise switched on after the air bag unit has been removed, there is no possibility that the inflating means 6 is operated. In case the electric power supply line 18 is connected to the discharging circuit 28 like in this embodiment, the resistance value of the discharging resistor 28a must be set at a high value in order to prevent the battery 13 from overdischarging when one has failed to switch off the ignition switch 14. This results in a longer time in discharging of the capacitor 23. In view of this disadvantage, in another embodiment shown in FIG. 4, it is so arranged that the wrong operation preventing switch 21 is of a double-switch type having a first switch $21_1$ and a second switch $21_2$, so that, at the time of removing the air bag unit, the electrical connection between the electric power supply line 18 and the ignition circuit 20 is cut off by the first switch $21_1$ and a discharging line 23c directly connected to the capacitor 23 is connected to the discharging circuit 28 by the second switch $21_2$. In this arrangement, though the electric current from the battery 13 also flows through the discharging circuit 28 if one fails to switch off the ignition switch 14, this electric current flows through a charging resistor 23a for the capacitor 23. The overdischarging of the battery 13 can therefore be prevented by setting the resistance value of the charging resistor 23a at a large value. Accordingly, the discharging time of the capacitor 23 can be shortened by setting the resistance value of the discharging resistor 28a to a small value.

When one fails to tighten the bolt 3 at the time of mounting the air bag unit, the wrong operation preventing switch 21 remains cut off. In such a case, the alarm lamp 25 is switched on by the monitor circuit 24.

In the above-described embodiment, the wrong operation preventing switch 21 is arranged to be changed over through the operation of the bolt 3. However, the changing over needs not be limited to the above-described embodiment; in stead, an arrangement may be employed in which, for example, the changing over is made by the movement in the axial direction of the air bag unit at the time of mounting or removing thereof.

Figure 7:
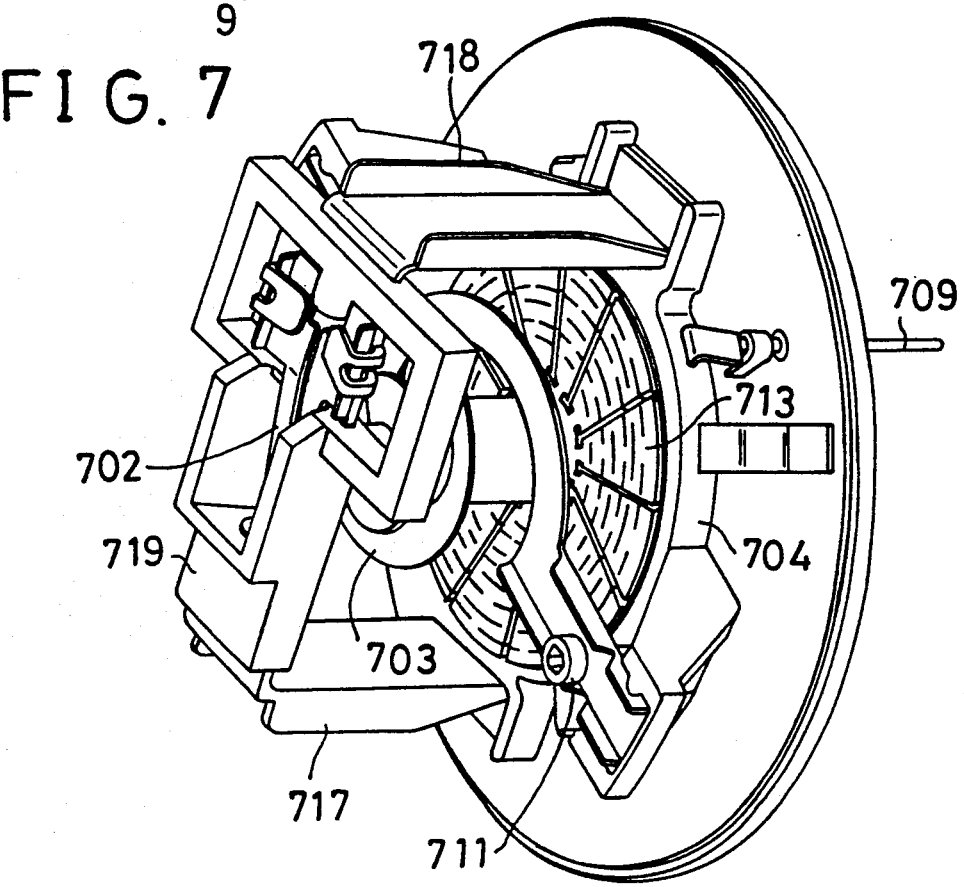
FIG. 7 is a perspective view of an inside of the first acceleration sensor.
Figure 6:
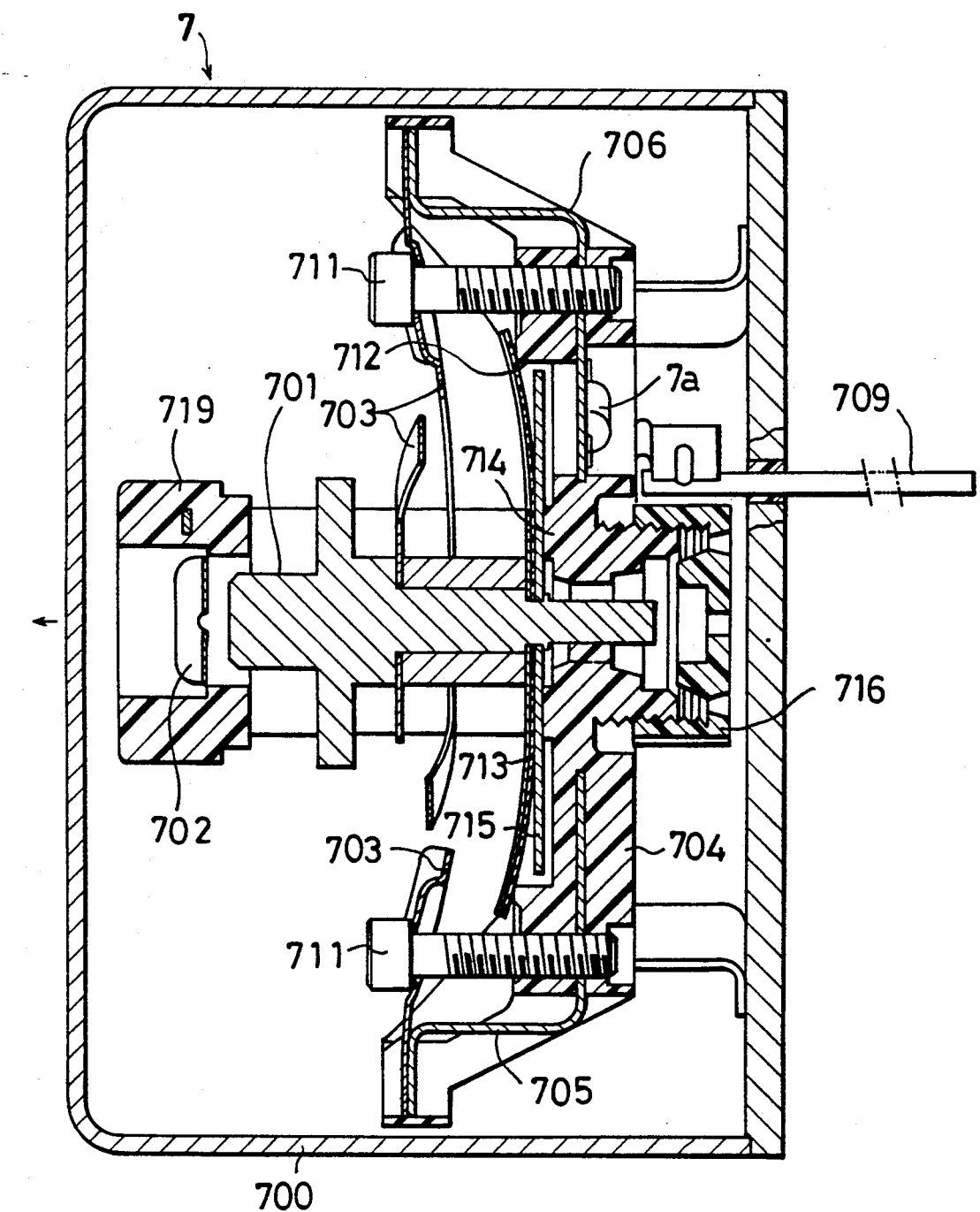
FIG. 6 is a sectional view of a first acceleration sensor in the above-described embodiment.
Figure 8:
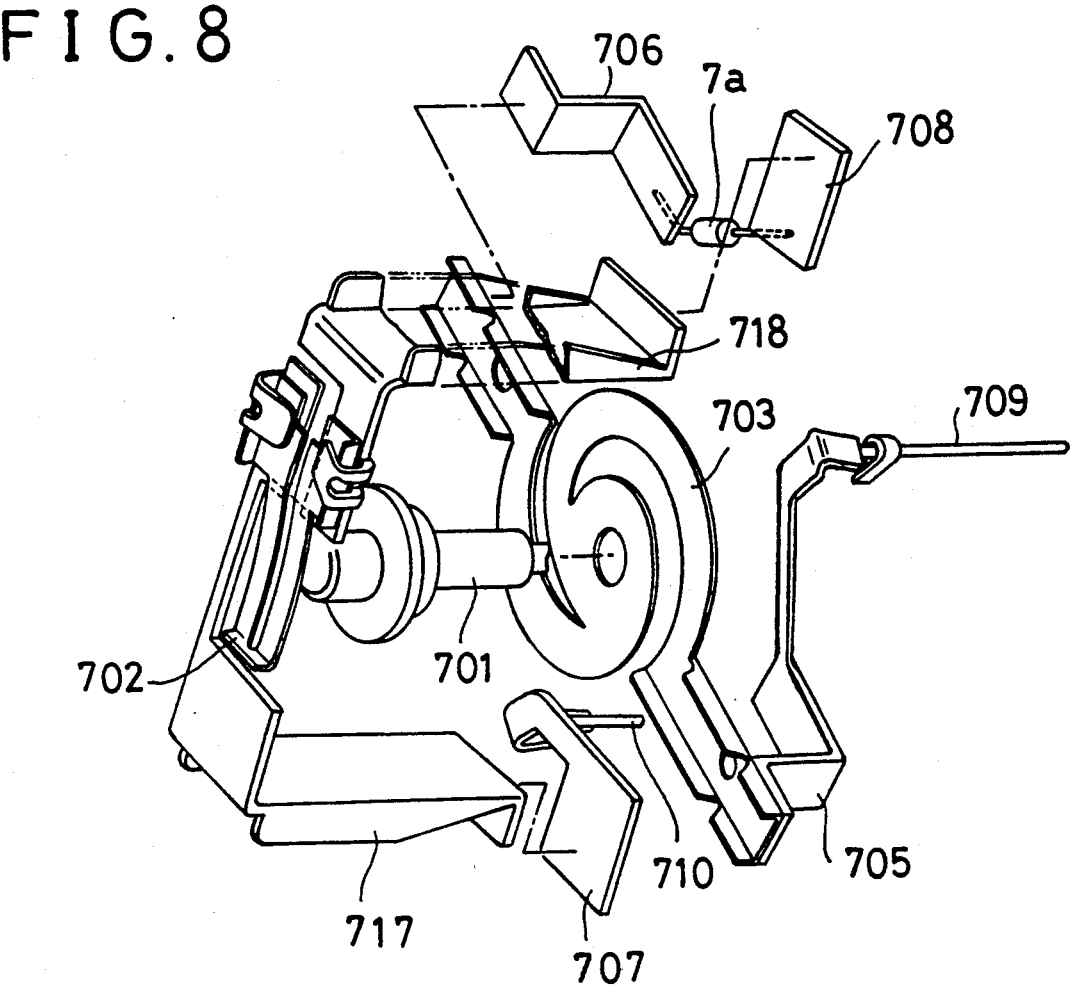
FIG. 8 is an exploded perspective view of component parts of the first acceleration sensor.

The above-described first acceleration sensor 7 comprises, as shown in FIGS. 6 through 8, a movable element 701 constituting a movable contact and a fixed contact 702 which is opposingly disposed in front of the movable element 701, both being enclosed inside a casing 700. It is so arranged that the movable element 701 is supported by a spring 703 which is made up of a spiral metallic plate so that the movable element 701 is moved forwards against the spring 703 through the inertia force at the time of crushing of the vehicle, thereby coming into contact with the fixed contact 702. In more detail, inside the casing 700 there is fixedly provided an electrically insulating base plate 704. A pair of a first and a second terminal plates 705, 706 are embedded in a diametrically opposite predetermined side portions of the base plate 704. Another pair of a third and a fourth terminal plates 707, 708 are embedded in a diametrically opposite side portions which are at right angles to a first and a second terminal plates 705, 706. The first and the third terminal plates 705, 707 are connected to a first and a second terminal pins 709, 710 respectively. The spring 703 is overlapped at its both ends with the first and the second terminal plates 705, 706. They are pressed together at a suitable fastening force by adjusting bolts 711 which screw into the base plate 704, and the movable element 701 is attached by fitting to the spring 703. It is thus so arranged that the movable element 701 is electrically connected to the first terminal pin 709 through the first terminal plate 705 and the spring 703. At the rear end of the movable element 701, there are provided a diaphragm 713 which closes a circular concave portion 712 formed in a front portion of the base plate 704, and an abutting plate 715 which abuts a projection 714 at the bottom of the concave portion 712 and receives the urging force of the spring 703. A variable orifice member 716 for restricting an air passage communicating to the concave portion 712, is provided in the base plate 704 so that an air damping effect to restrict the forward movement of the movable element 701 can be obtained by the orifice member 716 through the cooperation thereof with the diaphragm 713. There are also vertically provided on the base plate 704 a first and a second connecting plates 717, 718 which respectively overlap with the third and the fourth terminal plates 707, 708. At the front end of the first connecting plate 717 there is provided a bent portion which extends towards the second connecting plate 718. At the front end of the second connecting plate 718 there is provided a bent portion which is disposed in parallel with and beside the above-described bent portion at a clearance therebetween. The fixed contact 702 is constituted by a U-shaped tongue-like member, and both ends thereof are respectively caulked with the bent portions of the connecting plates 717, 718. It is thus so arranged that the fixed contact 702 is electrically connected to the second terminal pin 710 through the third terminal plate 707 and the first connecting plate 717. In addition, the above-described bypass resistor 7a is connected between the fourth terminal plate 708 which is connected to the fixed contact 702 through the second connecting plate 718, and the second terminal plate 706 which is connected to the movable element 701 through the spring 703. The bent portions of the connecting plates 717, 718 are buried into a resin block 719.

According to the above-described arrangement, when the forward inertia force to be exerted to the movable element 701 exceeds the urging force of the spring 703 and the restricting force due to the above-described air damping effect, the movable element 701 is moved forwards to contact the fixed contact 702, so that the first acceleration sensor 7 becomes electrically conducted. In case where the fixed contact 702 or the spring 703 is damaged, there will flow no electric current through the bypass resistor 7a and the alarm lamp 25 will be switched on by the monitor circuit 24.

Figure 9:
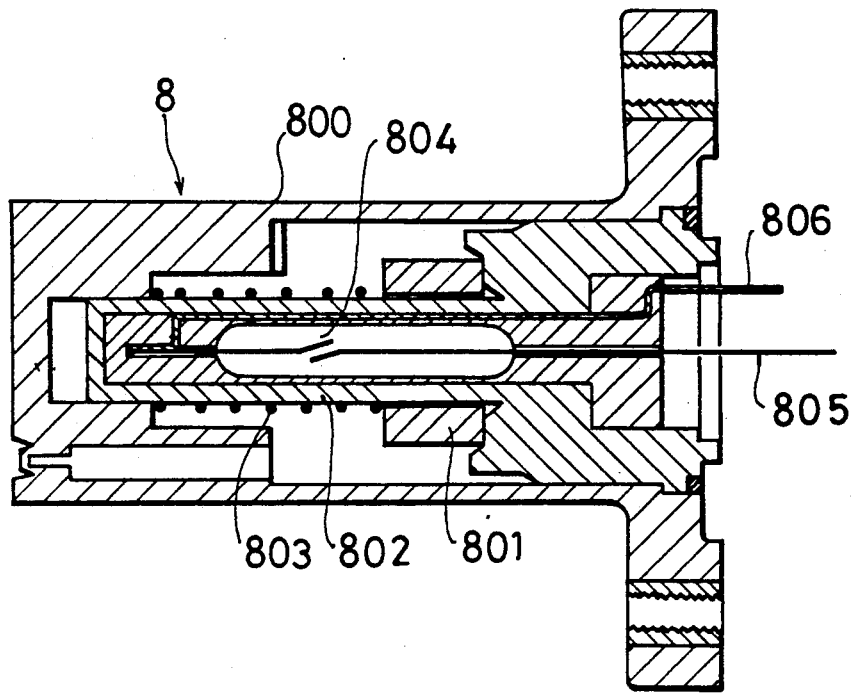
FIG. 9 is a sectional view of a second acceleration sensor of the above-described embodiment.

The second acceleration sensor 8 comprises, as shown in FIG. 9, a movable element 801 which is made up of a ring-like magnet and is contained inside a casing 800 such that the movable element 801 externally surrounds a cylindrical holder 802 which is fixedly provided inside the casing 800. The movable element 801 is urged backwards by a spring 803. A lead switch 804 is embedded in a molded resin with the lead switch being inserted into the holder 802 and a pair of terminal pins 805, 806 which are connected to the respective ends of the lead switch 804 are projected towards the rear of the casing 800. When the movable element 801 is moved forwards by the inertia force at the time of crushing of the vehicle against the urging force of the spring 803, the lead switch 804 is closed to make the second acceleration sensor 8 into a conducting state.

The first and the second acceleration sensors 7, 8 are respectively mounted on the circuit board 27 such that the moving direction of each movable element 701, 801 becomes parallel with the axis of rotation of the steering wheel, i.e., the axial line of the steering shaft 1. Therefore, even if the position of each acceleration sensor 7, 8 is changed in accordance with the steering operation, the direction of movement of each movable element 701, 801 is maintained constant. The crushing detection capacity or characteristics of the respective acceleration sensors 7, 8 is not changed by the steering operation.

In the above-described embodiment, the first and the second acceleration sensors 7, 8 are connected in series with the inflating means 6 being interposed therebetween to prevent the inflating means 6 from being wrongly ignited. It is however possible to connect the acceleration sensors 7, 8 in parallel. Further, two pieces of the first acceleration sensors 7 and two pieces of the second acceleration sensors 8 may, respectively, be connected in parallel with each other such that these two sets of parallelly connected circuits may be connected in series with the inflating means 6 being interposed therebetween. Furthermore, the accelerating sensors need not be limited to the above-described kinds. It will suffice if at least two pieces of accelerating sensors of different kinds are provided.

As described above, according to the invention as set forth in claim 1, the air bag apparatus is arranged in a unit inclusive of the acceleration sensors. Therefore, the ease of mounting the apparatus on the vehicle and the ease of maintenance thereof are improved. In the electrically ignited type of air bag apparatus as set forth in claim 3, it has an advantage in that the wiring can be simplified by constituting it into a unit. In addition, since there are provided in the air bag unit a plurality of acceleration sensors of different kinds, there is little or no possibility of their going out of order all at the same time even if the plurality of acceleration sensors are placed in the same environmental conditions by making them into a unit. This brings about an advantage in that the reliability of the air bag apparatus is improved. According to the invention as set forth in claim 2, by disposing the air bag unit on the steering wheel, the direction of movement of the movable element of each acceleration sensor is maintained constant even if the position of each of the acceleration sensors to be disposed inside the air bag unit is changed in accordance with the steering operation. This has an advantage of preventing the crushing detection capacity or characteristics from being changed in accordance with the steering operation. Furthermore, according to the invention as set forth in claim 4, the inflating means can be securely prevented from being operated at the time of removing the air bag unit. In addition, the inflating means can also be prevented from being operated by inadvertent operation of the switch or otherwise after the air bag unit has been removed. This has an advantage in that the mounting and removing operations of the air bag unit can be facilitated and that the storing, keeping, transporting or the like of the air bag unit becomes easy.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An air bag apparatus for a vehicle, comprising:
an air bag unit, including
   (a) an air bag,
   (b) an electrically ignitable inflating means,
   (c) a plurality of acceleration sensors, wherein at least two of said acceleration sensor are of different kinds, wherein each of said acceleration sensors controls electric current supply to said inflating means and wherein, said air bag, inflating means, and acceleration sensors are disposed in a single place proximal to one another, said air bag unit further including,
   a capacitor which services as a backup power source and is provided in parallel with a main power source for supplying electric current to said inflating means.
   a wrong operation preventing switch which is switched by mounting or removing said air bag unit and is so operated to cut off an electrical connection between said main power source, as well as said capacitor, and said inflating means when said air bag unit is removed, and
   a circuit for discharging said capacitor, said circuit being closed in interlocking with the cutting off of the electrical connection between said main power source, as well as said capacitor, and said inflating means.

2. An air bag apparatus according to claim 1, wherein said air bag unit is disposed on a steering wheel and wherein each of said acceleration sensors is disposed such that a direction of movement of a movable element to be provided in each of said acceleration sensors is parallel to an axis of rotation of said steering wheel.

* * * * *